United States Patent
Vandenhende et al.

(10) Patent No.: US 7,056,956 B2
(45) Date of Patent: Jun. 6, 2006

(54) METHOD FOR RECYCLING A PLASTIC MATERIAL

(75) Inventors: Bernard Vandenhende, Leest (BE); Jean-Philippe Dumont, Brussels (BE)

(73) Assignee: SOLVAY (Societe Anonyme), Brussels (BE)

( * ) Notice: Subject to any disclaimer, the term of this patent is extended or adjusted under 35 U.S.C. 154(b) by 349 days.

(21) Appl. No.: 10/221,179

(22) PCT Filed: Mar. 19, 2001

(86) PCT No.: PCT/EP01/03019

§ 371 (c)(1), (2), (4) Date: Dec. 19, 2002

(87) PCT Pub. No.: WO01/70865

PCT Pub. Date: Sep. 27, 2001

(65) Prior Publication Data

US 2003/0119925 A1    Jun. 26, 2003

(30) Foreign Application Priority Data

Mar. 23, 2000 (FR) .................................. 00 03754

(51) Int. Cl.
*C08J 11/08* (2006.01)
*B29B 17/00* (2006.01)

(52) U.S. Cl. ...................... 521/46.5; 521/40; 521/45.5; 521/47; 521/48; 521/49; 521/49.5; 521/45; 521/44.5

(58) Field of Classification Search .................. 521/40, 521/45.5, 46.5, 47, 48, 49, 49.5, 45
See application file for complete search history.

(56) References Cited

U.S. PATENT DOCUMENTS

| 3,836,486 | A | * | 9/1974 | Hafner | 521/46.5 |
| 4,071,479 | A | * | 1/1978 | Broyde et al. | 521/46.5 |
| 4,469,818 | A | * | 9/1984 | Grundmann | 521/64 |
| 4,668,768 | A | * | 5/1987 | Mendiratta et al. | 528/493 |
| 6,172,125 | B1 | | 1/2001 | Vandenhende et al. | |

FOREIGN PATENT DOCUMENTS

| EP | 0 945 481 | 9/1999 |
| JP | 48-16987 | 3/1973 |

OTHER PUBLICATIONS

Properties of Polymers, "Their Correlation with Chemical Structure . . . " D.W. Van Krevelen, Elsevier (1990).
Solubility Parameter Values, H. Burrell, Inmont Corporation. Clifton, New Jersey.

* cited by examiner

*Primary Examiner*—Tae H. Yoon
(74) *Attorney, Agent, or Firm*—Oblon, Spivak, McClelland, Maier & Neustadt, P.C.

(57) ABSTRACT

Process for recycling a plastic, according to which the plastic is brought into contact with a solvent capable of dissolving the same and the plastic dissolved in the solvent is precipitated using a non-solvent in the presence of a phase-separating agent, in which the phase-separating agent is compatible with the solvent and incompatible with the non-solvent, and is also present when the plastic is brought into contact with the solvent, and improves the dissolution of the plastic by the solvent.

10 Claims, No Drawings

METHOD FOR RECYCLING A PLASTIC MATERIAL

The present invention relates to a process for recycling a plastic.

Plastics are extensively used for manufacturing a variety of flexible or rigid articles, for example tarpaulins, coated fabrics and other elements for the interior furnishing of vehicles, pipes, window frames, or polymer-insulated-power cables.

Thorough grinding of these articles usually results in a mixture of fine particles of heterogeneous composition, which is difficult to purify and reuse. Furthermore, in the case of fibre-reinforced articles (for example polyester-fibre-reinforced articles) the fibres often form a kind of wadding which makes it much more complicated to reuse the ground particles.

Various processes based on dissolution by means of organic solvents have previously been proposed. Thus the applicant's Patent Application EP 945481 proposes a process for recycling an article based on at least one vinyl chloride polymer, according to which:

(a) the article is shredded into fragments having an average dimension of from 1 cm to 50 cm, should it exceed these dimensions;
(b) the fragments of the article, which are dry, are brought into contact with a substantially anhydrous solvent which is capable of dissolving the polymer and forms an azeotrope with water;
(c) the precipitation of the polymer dissolved in the solvent is brought about by injecting steam into the resultant solution, which, furthermore, brings about entrainment of the solvent-water azeotrope and thus gives a remaining mixture essentially consisting of water and of solid particles of polymer;
(d) the particles of polymer are recovered.

Given the cost of the solvent and the drawbacks which could be associated with its discharge into the environment, it is desirable to treat the azeotropic fraction so as to recover the solvent therefrom. The solution proposed in the above-mentioned patent application consists in utilizing $CaCl_2$ as phase-separating agent bringing about settling of the (liquid) azeotrope into an aqueous and a phase essentially consisting of solvent. This $CaCl_2$ is present in the aqueous phase and can be reused as phase-separating agent by way of reconcentration, by evaporating water. This operation is costly both in terms of energy requirements and of apparatus, given the corrosiveness of $CaCl_2$.

This type of problem, namely the reclaiming of constituents from a solvent-non-solvent mixture is in fact a circumstance encountered in most plastics-recycling processes involving dissolution in a solvent and precipitation of the dissolved plastic by a non-solvent.

The present invention is based on the surprising observation that the addition of certain phase-separating agents to the solvent-non-solvent mixture for a plastic permits not only easier settlement of this mixture but also an increase in the dissolving power of the phase rich in solvent with respect to the plastic concerned. The process therefore becomes more flexible, less energy-intensive and less costly.

Consequently, the present invention aims to provide a recycling process which is simple, economic, reliable, does not produce much pollution, and permits plastics of high purity to be recovered.

More specifically, the present invention relates to a process for recycling a plastic, according to which the plastic is brought into contact with a solvent capable of dissolving the same and the plastic dissolved in the solvent is precipitated using a non-solvent in the presence of a phase-separating agent, in which the phase-separating agent is compatible with the solvent and incompatible with the non-solvent, and is also present when the plastic is brought into contact with the solvent, and improves the dissolution of the plastic by the solvent.

The plastic concerned may be of any type. It may be a non-polar polymer, such as a polymer of ethylene (PE) or of propylene (PP). It may also be a polar polymer, such as a polymer of vinyl chloride (PVC) or of vinylidene chloride (PVDC). Good results have been obtained with PVC. The term PVC should be understood to mean any homo- or copolymer containing at least 50% by weight of vinyl chloride.

The plastic may be-in any form. For example, it may be waste from polymerization, from compounding or from use, optionally in a liquid or pasty state, or optionally even in solution in a solvent. It may also be solid articles comprising one or more common additives, such as plasticizers, stabilizers, antioxidants, flame retardants, pigments, fillers, and the like, including reinforcing fibres. These fibres may be of any type, natural or synthetic; it is particularly possible to use glass fibres, cellulose fibres or plastic fibres. The fibres are often plastic, and in particular polyester fibres. Polyethylene terephthalate (PET) gives good results, particularly for reinforcing sheets used as tarpaulins. The diameter of the fibres is usually of the order of from 10 to 100 µm. In reinforced sheets the fibres are often long fibres whose length may reach a number of meters. The fibres may, of course, also be relatively short fibres, of from a few millimeters to a few centimeters in length, optionally forming a fabric, a nonwoven, or a felt. By way of illustration, the fibres may represent from 1 to 50% by weight of a reinforced sheet.

These articles may be in the form of flexible or rigid pipes, containers, sheets for covering soil, tarpaulins, window frames, insulating sheaths of power cables, etc. They may have been manufactured by any known technique: extrusion, coating, injection moulding, etc. It can prove to be of interest to shred these articles by reducing them to smaller fragments which are easy to handle and by dissolution in the process according to the invention. Appropriate shredding treatments are described in the abovementioned Patent Application EP 945481 and are incorporated into the present application by way of reference.

In the process according to the invention, the plastic is brought into contact with a solvent capable of dissolving the same, in the presence of a phase-separating agent. If the article is fibre-reinforced, the solvent-phase-separating agent mixture does not, however, have to bring about dissolution of constituents other than the plastic to be recycled. The reclaiming of any reinforcement materials or "accessories" present, such as metal islets, labels, metallic conductors, etc., which had been incorporated in or joined to the plastic and which would not have been removed therefrom before being subjected to the process according to the invention, is described in Patent Application EP 945481 and incorporated herein by way of reference.

According to the present invention, the phase-separating agent is defined as a compound which favours the settlement of the solvent-non-solvent mixtures for the plastic. According to the present invention, this agent is, furthermore, compatible with the solvent and incompatible with the non-solvent, and it improves the dissolution of the plastic by the solvent. Thus, this phase-separating agent is virtually absent in the phase rich in non-solvent stemming from the settlement process, and which can be advantageous if the non-solvent can be discharged to the environment (for example if this non-solvent is water) and can also favour the production of a plastic substantially free from this agent.

The dissolution process generally takes place at a pressure of at least atmospheric pressure, more specifically at least 1.5 bar. This pressure advantageously does not exceed 10 bar, preferably 5 bar.

The temperature of the dissolution process is generally at least 75° C., more specifically 100° C.; it generally does not exceed 125° C., more specifically 110° C.

It may, furthermore, prove advantageous to work in an inert atmosphere, for example under nitrogen, to avoid any risk of explosion or of degradation of the solvent, of the non-solvent and/or of the phase-separating agent.

The quantity of solvent and of phase-separating agent selected for use has to be such that the increase in viscosity brought about by dissolving the plastic does not disrupt the good running of the process (filtration, etc.). During the dissolution step it is preferable for the amount of plastic not to exceed 200 g per liter of solvent-phase-separating-agent mixture, and in particular 100 g/l.

From the point of view of reuse of the plastic thus recovered, one advantageous version of the process according to the invention consists in incorporating in the solvent, prior to or during the stage of dissolution of the plastic, and in addition to the phase-separating agent, one or more additives (stabilizers, plasticizers, etc.), the types and quantities of which may be adapted to the properties which it is desired to confer on the recycled plastic. In this case it is desirable for the additive(s) thus incorporated to be soluble in the solvent used. However, any insoluble additives may be finely dispersed in the solvent.

After the dissolution of the plastic and any separation of the undissolved constituents, the precipitation of the dissolved plastic is brought about optionally by reducing the pressure (generally as far as atmospheric pressure), this generally bringing about a reduction in the temperature, but mainly by adding, to the solvent comprising the dissolved plastic, a non-solvent in a quantity sufficient to bring about the complete precipitation of the dissolved plastic. This precipitation is advantageously implemented by injecting non-solvent in both liquid and gaseous form, the consequence being faster precipitation of the plastic. It is not harmful if the non-solvent injected comprises a low concentration of solvent; this fact is of interest to the extent that, as explained below, an optional later stage of the process can specifically provide such a source of non-solvent, which can thus be reused without any special purification.

With a view to reducing the size of the particles obtained by precipitation, it is advantageous for this precipitation to take place in the presence of a dispersing agent. From a practical viewpoint, this is advantageously added to the solvent from the beginning of the dissolution of the plastic. Alternatively, this dispersing agent may be added at the same time as the non-solvent used for the precipitation (either in the same stream or separately), but this procedure is more difficult to monitor and could lead to a lack of homogeneity of the medium. According to this version of the invention, the term dispersing agent should be understood to mean surfactants, such as bentonite, polyvinyl alcohol, gelatin, esters or ethers of cellulose, water-soluble (co) polymers, etc. Ethers of cellulose give good results. According to this version of the invention, the amount of dispersing agent used is generally greater than or equal to 0.001% by weight, based on the weight of PVC, preferably greater than or equal to 0.01%, or more preferably greater than or equal to 0.1%. The content of dispersing agent is generally less than or equal to 5%, more specifically 2%, more preferably 1%.

Another means permitting reduction of the particle size of the product obtained is the gradual addition of the non-solvent to the solvent comprising the dissolved plastic and the reduction of the pressure below atmospheric pressure during the gradual addition of non-solvent. A phase inversion is then generally observed, that is to say the precipitation medium changes from a dispersion of the non-solvent in the solvent to a dispersion of the solvent in the non-solvent. This phenomenon is accompanied by a sudden fall in the viscosity, and it is from that moment that the plastic, which was dissolved, precipitates in the form of increasingly dense grains. It is particularly advantageous that the reduction in pressure recommended above takes place before the phase inversion, so that the inversion takes place at reduced pressure. According to this advantageous version of the present invention, the pressure is generally equal to or less than 0.9 bar, more specifically 0.8 bar and preferably 0.7 bar during phase inversion. This pressure is generally greater than 0.2 bar, more specifically than 0.4 bar. Another advantage of a reduction in the pressure during the gradual addition of non-solvent is that it permits pushing-back of the plastic critical concentration threshold, the threshold at which the medium is observed to set. The pressure reduction therefore permits, as it were, more polymer to be treated with the same quantity of solvent.

Finally, to reduce the particle size to the maximum extent and to obtain a product free from agglomerates it is advantageous both to use a dispersing agent and to reduce the pressure below atmospheric pressure during the gradual addition of non-solvent.

The solvent capable of dissolving the plastic is preferably selected among liquids having a solubility parameter (for which a definition and experimental values are given in "Properties of Polymers", D. W. Van Krevelen, 1990 Edition, pp. 200–202, and also in "Polymer Handbook", J. Brandrup and E. H. Immergut, Editors, Second Edition, p. IV-337 to IV-359) close to the solubility parameter of the plastic to be dissolved. Regarding the non-solvent for the plastic, this is preferably selected to have a solubility parameter markedly different from that of the plastic to be dissolved. Of course, the terms solvent and non-solvent mean either pure substances or mixtures of substances. The phase-separating agent preferably also has a solubility parameter different from that of the plastic to be dissolved.

In one preferred version of the process according to the invention, the solubility parameter of the solvent is close to that of the plastic, and that of the phase-separating agent is:

lower than the solubility parameter of the plastic if the solubility parameter of the non-solvent is higher than that of the plastic higher than the solubility parameter of the plastic if the solubility parameter of the non-solvent is lower than that of the plastic.

It is important to note that many waste plastics comprise a not insignificant amount of water which, due to its polarity, has a solubility parameter much higher than that of the plastics and is therefore a non-solvent for these. In one preferred version of the process according to the present invention, therefore, the non-solvent selected for the precipitation of the plastic dissolved in the solvent is water, and the phase-separating agent is a non-polar organic compound (which therefore has a solubility parameter much lower than that of water).

In one preferred version of the process according to the invention, the phase-separating agent and the solvent are substantially removed from the precipitation medium by evaporation at a temperature lower than the boiling point of the non-solvent. This removal is in particular made possible by choosing substances having a boiling point lower than that of the non-solvent and/or giving an azeotrope with the latter.

In the context of the process according to the invention it is advantageous for the solvent used to be miscible with the non-solvent and to form an azeotropic mixture with the same. In this case, much of the solvent can be removed by evaporation of the precipitation medium in the form of vapour of azeotropic composition.

In certain cases, the vapour comprising the solvent and the phase-separating agent also comprises a substantial fraction of non-solvent. This vapour is then advantageously condensed and subjected to a settlement process and to subsequent removal of the phase rich in non-solvent prior to reuse for the dissolution of the plastic. This reuse may take place during a later process if the process is a batchwise recycling of the plastic, or may be an integral part of the process itself in the case of a continuous process. The phase rich in non-solvent deriving from the settlement process may also be reused during the precipitation of the plastic, as mentioned above.

An important advantage of the process of the present invention is therefore that it can operate in a closed loop without producing discharges, given that the phase comprising the solvent and the phase-separating agent, and also the phase comprising the non-solvent, can be recycled and reused in the process.

According to another advantageous version of the process of the present invention, the vapour comprising the solvent and the phase-separating agent is simply condensed and reused, without further processing, for the dissolution of the plastic, without any prior settlement process. This is advantageous when the vapour comprises little non-solvent and/or when it is possible to operate in two-phase equilibrium, with two phases (a phase rich in solvent and comprising substantially all of the phase-separating agent, since this agent is compatible with the solvent and incompatible with the non-solvent; and a phase rich in non-solvent). With correct selection of the concentrations of separating agent (the concentrations required to obtain the right solubility parameter), thus the phase rich in solvent reliably provides selective dissolution of the plastic. The phase rich in non-solvent does not impair this dissolution process. Being, thus, part of a two-phase system, the phase rich in solvent becomes completely insensitive to the quantity of non-solvent added (for example, to the water present in the plastic for recycling). There is merely an increase in the amount of phase rich in non-solvent. The process according to this version of the invention is therefore more flexible in terms of the range of acceptable concentrations of non-solvent. Another important advantage of this version is therefore that there is no longer any need for prior removal (by drying) or subsequent removal of the water introduced with the plastic for recycling. In the process of the invention it is then sufficient to select water as non-solvent and the water present in the plastic is then simply transferred to the phase rich in non-solvent. This is an important saving in energy, given the significant latent heat of vaporization of water.

The process according to the invention has been applied with success to the recycling of PVC, selecting MEK (methyl ethyl ketone) as solvent and water as non-solvent and an aliphatic hydrocarbon having from 5 to 7 carbon atoms as phase-separating agent. Excellent results have been obtained by selecting n-hexane as phase-separating agent.

The characteristics of the process according to the present invention may advantageously be integrated into any process where the plastic is PVC and where:
(a) the PVC is brought into contact with the solvent and the phase-separating agent and is dissolved;
(b) the precipitation of the PVC dissolved in the solvent is brought about by injecting steam into the resultant solution, which permits removal of the solvent and the phase-separating agent by evaporation and thus gives a remaining mixture essentially consisting of water and of solid particles of PVC;
(c) the particles of PVC are recovered.

More specifically, the characteristics of the process according to the present invention may be integrated into the process which is described in Patent Application EP 945 481 and which is incorporated herein by way of reference. In this case it is advantageous to select a batch process which operates in a loop with reclamation of the vapour comprising the solvent and the phase-separating agent, condensation and recycling of a fraction, or of the entirety, of this vapour for the dissolution process in the following batch. In this case, good results have been obtained with MEK as solvent and n-hexane as phase-separating agent. The phase-separating agent is added during the first batch, either at the dissolution stage or after condensation of the vapour. The second solution has given good results. Prior to the recycling (of a fraction) of the condensed vapour, it may prove of interest to allow this to settle, by the action of the phase-separating agent, and to remove the phase rich in non-solvent. Alternatively, it is possible to recycle all of the condensed vapour, as long as the amount of phase-separating agent used is adjusted. This is because, in this particular case, the dissolution medium comprises a significant amount of non-solvent and there must be enough phase-separating agent to counterbalance the adverse effect of the non-solvent on the dissolution of the plastic. With certain compounds, such as MEK (as solvent), water (as non-solvent) and n-hexane (as phase-separating agent), the formation of two phases is observed during the dissolution process. In this case, since the total content of water in the medium is generally at least 5% (by weight) it is desirable to select a hexane content of at least 5% also (given that the remainder of the medium consists of MEK) in order to obtain a phase rich in MEK capable of dissolving the PVC over an acceptable range of temperatures. The desirable content of water preferably does not exceed 15%, and this permits the content of hexane to be limited to 30%.

EXAMPLE 1

A series of experiments was carried out, involving the following stages:
1. 15 kg of PVC homopolymer were dissolved in 147 kg of MEK and 8 kg of water (coming from PVC waste which has not been dried prior to dissolution) under a pressure of +/−3.5 bara (bar absolute) and at a temperature of 110° C. (this temperature being necessary for dissolution of the PVC in 10 min) in a stirred autoclave of 250 l utilizable capacity;
2. the pressure on the solution was reduced to 1 bara and 90 kg of water were injected (60 kg in the form of vapour and 30 kg in the form of liquid); this precipitated the dissolved PVC; as long as some MEK was still present in the medium, the temperature remained approximately equal to 74° C. (boiling point of the azeotrope at 1 bara); when virtually all of the MEK had been entrained, the temperature rose to reach 100° C. and was maintained at that level for a period of 30 min;
3. the vapour was recovered and condensed at 30° C.; n-hexane was added thereto so as to obtain a mixture comprising 170 kg of MEK (78.9% by weight), 23 kg of water (10.8%) and 22 kg of hexane (10.3%);
4. the mixture was then stirred vigorously and allowed to settle for 30 min at 30° C.;
5. this gave 155 kg of the phase rich in solvent, which comprises 83.5% of MEK, 5% of water and 11.5% of hekane;
6. this was heated to 115° C. under 4.4 bara and was decanted into the dissolution reactor;
7. another dissolution process was run with 15 kg of PVC in a medium comprising 83.5% of MEK, 5% of water and 11.5% of hexane; this time, a temperature of about 90° C. was sufficient for easy dissolution of the PVC in 10 min under 2.8 bara;
8. the pressure on the solution was reduced to 1 bara and 90 kg of water were injected therein (60 kg in the form of vapour and 30 kg in the form of liquid); precipitation of the dissolved PVC was observed; the vapour was collected and condensed;
9. following stirring, this was allowed to settle for a period of 5 min; this again gave 155 kg of the phase rich in solvent, which comprises 83.5% of MEK, 5% of water and 11.5% of hexane;
10. another dissolution process is carried out with 15 kg of PVC in a medium comprising 83.5% of MEK, 5% of water and 11.5% of hexane at a temperature of 90° C., in 10 min.

Measurements show that after centrifuging, the PVC which had separated from the aqueous phase comprised only 60 ppm of MEK and 13 ppm of hexane, and that the precipitation water comprised only 100 ppm of MEK and 10 ppm of hexane.

EXAMPLE 2

A series of experiments was carried out, involving the following stages:
1. 15 kg of PVC homopolymer were dissolved in 147 kg of MEK and 8 kg of water (coming from PVC waste which has not been dried prior to dissolution) under a pressure of ±3.5 bara and at a temperature of 110° C. (this temperature being necessary for dissolution of the PVC in 10 min) in a stirred autoclave of 250 l capacity;
2. the pressure on the solution was reduced to 1 bara and 90 kg of water were injected therein (60 kg in the form of vapour and 30 kg in the form of liquid); this precipitated the dissolved PVC; as long as some MEK was still present in the medium, the temperature remained approximately equal to 74° C. (boiling point of the azeotrope at 1 bara) when virtually all of the MEK had been entrained, the temperature rose to reach 100° C. and was maintained at that level for a period of 30 min;
3. the vapour was recovered and condensed at 30° C.; n-hexane was added thereto so as to obtain a 155 kg mixture comprising 109.4 kg of MEK (71% by weight), 22.4 kg of water (14%) and 23.3 kg of hexane (15%o);
4. this mixture was taken without further modification for the following dissolution process;
5. this was heated to 110° C. under 4.4 bara and was decanted into the dissolution reactor;
6. another dissolution process was run with 15 kg of PVC in a medium comprising 71% of MEK, 14% of water and 15% of hexane; this time, a temperature of about 90° C. was sufficient for easy dissolution of the PVC in 10 min under 3.3 bara;
7. the pressure on the solution was reduced to 1 bara and 90 kg of water were injected therein (60 kg in the form of vapour and 30 kg in the form of liquid); this precipitated the dissolved PVC; the vapour was collected and condensed;
8. some of this condensed vapour was taken in order to obtain the same proportion and weights as in point 3 above;
9. another dissolution process is carried out with 15 kg of PVC in a medium comprising 71% of MEK, 14% of water and 15% of hexane; this time a temperature of 90° C. was again sufficient to obtain the dissolution of the PVC in 10 min under 3.3 bara.

EXAMPLE 3

1. 155 kg of a solution comprising 82% of MEK, 5% of water and 13% of hexane were prepared;
2. this was heated to 115° C. under 4.4 bara and decanted into the dissolution reactor;
3. a dissolution process was run with 15.5 kg of PVC in this medium at 100° C. in 10 min under 2.8 bara;
4. the pressure on the solution was reduced to 1 bara and vapour and water in liquid form (60 kg in total) were gradually injected therein. When a stable vapour-injection regime had been achieved, the pressure in the reactor was reduced to 0.65 bara so that the phase change and the precipitation could occur at a reduced temperature of from 63.8 to 66° C.;
5. PVC was recovered in the form of particles having an average diameter of 375 μm, 90% of the particles of which are smaller than 489 μm.

EXAMPLE 4

1. 155 kg of a solution comprising 82% of MEK, 5% of water and 13% of hexane were prepared;
2. this was heated to 115° C. under 4.4 bara and decanted into the dissolution reactor;
3. a dissolution process was run with 14 kg of PVC in this solution at a temperature of 100° C. in 10 min under 2.8 bara;
4. the pressure on the solution was reduced to 1 bara and vapour and water in liquid form (60 kg in total) were gradually injected therein. The reactor was maintained at atmospheric pressure for the period of phase inversion and precipitation, which took place at a temperature of from 72 to 75° C.;
5. PVC having an average diameter of 621 μm was recovered, 90% of the particles of which are smaller than 883 μm.

EXAMPLE 5

1. 155 kg of a solution comprising 82% of MEK, 5% of water and 13% of hexane were prepared;
2. this was heated to 115° C. under 4.4 bara and decanted into the dissolution reactor;
3. a dissolution process was run with 14 kg of PVC in this solution at a temperature of 100° C. in 10 min under 2.8 bara;
4. the pressure on the solution was reduced to 1 bara and vapour and water in liquid form (60 kg in total) were gradually injected therein. When a stable vapour-injection regime had been achieved, the pressure in the reactor was reduced to 0.55 bara so that the phase change and the precipitation could occur at a reduced temperature of from 64 to 65° C.;

5. PVC having an average diameter of 324 μm was recovered, 90% of the particles of which are smaller than 443 μm.

EXAMPLES 6, 7 AND 8

1. a solution comprising 82% of MEK, 5% of water and 13% of hexane was prepared
2. a dissolution process was carried out using 250 g of PVC in 2 667 g of this solution in a 5 l glass reactor
3. dispersing agent (Methocel K100 (cellulosic ether)) was injected into the vessel in the amounts given in the table below,
4. the dissolved PVC was precipitated by injecting vapour at atmospheric pressure.

The table below summarizes the results obtained.

| Example | [Dispersing agent] (%) | Average diameter (μm) |
|---|---|---|
| 6 | 0 | 480 |
| 7 | 0.1 | 376 |
| 8 | 0.2 | 325 |

EXAMPLE 9

1. 155 kg of a solution comprising 82% of MEK, 5% of water and 13% of hexane were prepared;
2. this was heated to 115° C. under 4.4 bara and decanted into the dissolution reactor;
3. a dissolution process was run with 17.25 kg of PVC in this solution at a temperature of about 100° C. in 10 min under 2.8 bara;
4. the pressure on the solution was reduced to 1 bara and vapour and water in liquid form (60 kg in total) were gradually injected therein. The reactor was maintained at atmospheric pressure for the period of phase inversion and precipitation, which took place at a temperature of from 72 to 75° C.;
5. PVC with a very coarse particle size was recovered, only 76% of which passes through a 1 mm screen.

EXAMPLE 10

1. 155 kg of a solution comprising 82% of MEK, 5% of water and 13% of hexane were prepared;
2. this was heated to 115° C. under 4.4 bara and decanted into the dissolution reactor;
3. a dissolution process was run with 16.7 kg of PVC in this solution at a temperature of 100° C. in 10 min under 2.8 bara;
4. a dispersing agent identical to that used in Examples 6 to 8 was introduced during the dissolution at 0.2% by weight, based on the PVC
5. the pressure on the solution was reduced to 1 bara and vapour and water in liquid form (60 kg in total) were gradually injected therein. When a stable vapour-injection regime had been achieved, the pressure in the reactor was reduced to 0.7 bara and the phase inversion and precipitation took place at a reduced temperature of from 64 to 65° C.;
6. the reclaimed PVC has a much lower particle size, with 99.8% of the product passing through a 1 mm screen.

The invention claimed is:

1. A process comprising:
   contacting a plastic with a solvent capable of dissolving the plastic, to dissolve the plastic,
   precipitating the plastic dissolved in the solvent with water in the presence of a non-polar organic phase-separating agent to form a mixture comprising the solvent, water, the phase separating agent and precipitated plastic, and
   substantially removing the solvent and the phase-separating agent from the mixture comprising the solvent, water, the phase separating agent and the precipitated plastic, by evaporation at a temperature lower than the boiling point of water to form a vapor comprising the solvent and the separating agent;
   wherein the phase-separating agent is compatible with the solvent and incompatible with water, the phase-separating agent is present during contacting the plastic with the solvent, and the phase-separating agent improves the dissolution of the plastic by the solvent.

2. The process according to claim 1, wherein the precipitation of the plastic dissolved in the solvent takes place in the presence of a dispersing agent.

3. The process according to claim 1, further comprising gradually adding water to the plastic dissolved in the solvent, wherein the pressure is below atmospheric pressure during the gradual addition of water.

4. The process according to claim 1, wherein the solubility parameter of the solvent is close to that of the plastic, and the solubility parameter of the phase-separating agent is
   lower than the solubility parameter of the plastic if the solubility parameter of water is higher than that of the plastic, or
   higher than the solubility parameter of the plastic if the solubility parameter of water is lower than that of the plastic.

5. The process according to claim 1, wherein the solvent is miscible with water and forms an azeotropic mixture with water.

6. The process according to claim 1, further comprising condensing and settling vapor comprising the solvent, the phase-separating agent and a substantial fraction of the water, and
   removing a phase rich in water from the condensed vapor prior to dissolving the plastic with the condensed vapor.

7. The process according to claim 1, further comprising condensing the vapor comprising the solvent and the phase-separating agent and
   dissolving the plastic with the condensed vapor without further processing or settling of the condensed vapor.

8. The process according to claim 1, where the plastic is polyvinylchloride, the solvent is methylethylketone, and the phase-separating agent is an aliphatic hydrocarbon having from 5 to 7 carbon atoms.

9. The process according to claim 6, where the phase-separating agent is n-hexane.

10. The process according to claim 1, wherein the precipitation is carried out by injecting steam into the plastic dissolved in the solvent to remove the solvent and the phase-separating agent by evaporation, to form a mixture consisting essentially of water and solid particles of the plastic, and
    recovering the solid particles of the plastic,
    wherein the plastic is polyvinylchloride.

* * * * *